(12) United States Patent
Brackney et al.

(10) Patent No.: US 9,310,403 B2
(45) Date of Patent: Apr. 12, 2016

(54) BUILDING ENERGY ANALYSIS TOOL

(75) Inventors: Larry Brackney, Denver, CO (US);
Andrew Parker, Golden, CO (US);
Nicholas Long, Arvada, CO (US); Ian Metzger, Wheat Ridge, CO (US); Jesse Dean, Lakewood, CO (US); Lars Lisell, Denver, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 825 days.

(21) Appl. No.: 13/493,858

(22) Filed: Jun. 11, 2012

(65) Prior Publication Data

US 2013/0144546 A1 Jun. 6, 2013

Related U.S. Application Data

(60) Provisional application No. 61/495,646, filed on Jun. 10, 2011.

(51) Int. Cl.
*G06G 7/48* (2006.01)
*G01R 21/00* (2006.01)
(Continued)

(52) U.S. Cl.
CPC .............. *G01R 21/006* (2013.01); *G06F 17/40* (2013.01); *G06F 17/5004* (2013.01); *G06F 17/5009* (2013.01); *G06Q 10/063* (2013.01); *G06F 2217/16* (2013.01)

(58) Field of Classification Search
CPC ....... G06Q 10/00; G06Q 20/00; G06Q 30/00; G06Q 50/00; G06Q 10/063; G06F 1/28; G06F 1/32; G06F 7/42; G06F 7/44; G06F 3/00; G06F 3/02; G06F 3/048; G06F 15/00; G06F 15/16; G06F 17/50; G06F 19/00; G06D 23/12; G01K 1/02; G01K 17/02; G06G 7/63; G01D 4/00; F24D 19/1048; F24D 19/00
USPC .................... 703/1, 6, 13; 705/7.11, 80, 313; 700/277, 291
See application file for complete search history.

(56) References Cited

U.S. PATENT DOCUMENTS

| 8,457,802 B1 * | 6/2013 | Steven et al. ................. 700/291 |
| 2004/0159113 A1 * | 8/2004 | Singh et al. ..................... 62/129 |

(Continued)

FOREIGN PATENT DOCUMENTS

| WO | 2010/129913 | 11/2010 |
| WO | 2012/019022 | 2/2012 |
| WO | 2012/048304 | 4/2012 |

OTHER PUBLICATIONS

Crawley, et al., "Contrasting the capabilities of building energy performance simulation programs", Building and Environment, vol. 43, Issue 4, Mar. 2008, pp. 661-673.

(Continued)

*Primary Examiner* — Kandasamy Thangavelu
(74) *Attorney, Agent, or Firm* — John C. Stolpa; Robert G. Pittelkow (57) ABSTRACT

A building energy analysis system includes a building component library configured to store a plurality of building components, a modeling tool configured to access the building component library and create a building model of a building under analysis using building spatial data and using selected building components of the plurality of building components stored in the building component library, a building analysis engine configured to operate the building model and generate a baseline energy model of the building under analysis and further configured to apply one or more energy conservation measures to the baseline energy model in order to generate one or more corresponding optimized energy models, and a recommendation tool configured to assess the one or more optimized energy models against the baseline energy model and generate recommendations for substitute building components or modifications.

20 Claims, 3 Drawing Sheets

(51) Int. Cl.
*G06F 17/40* (2006.01)
*G06Q 10/06* (2012.01)
*G06F 17/50* (2006.01)

(56) References Cited

U.S. PATENT DOCUMENTS

| | | | |
|---|---|---|---|
| 2005/0128212 A1* | 6/2005 | Edecker et al. | 345/582 |
| 2008/0249756 A1* | 10/2008 | Chaisuparasmikul | 703/13 |
| 2009/0310851 A1* | 12/2009 | Arcas et al. | 382/154 |
| 2010/0235206 A1* | 9/2010 | Miller et al. | 705/7 |
| 2011/0015798 A1 | 1/2011 | Golden et al. | |
| 2011/0029341 A1* | 2/2011 | Muse | G06Q 10/063 705/7.11 |
| 2011/0231320 A1 | 9/2011 | Irving | |
| 2011/0246381 A1* | 10/2011 | Fitch et al. | 705/313 |
| 2012/0072181 A1* | 3/2012 | Imani | 703/1 |
| 2012/0095730 A1* | 4/2012 | Krebs et al. | 703/1 |
| 2012/0232701 A1* | 9/2012 | Carty et al. | 700/277 |

OTHER PUBLICATIONS

Swan, et al., "Modeling of end-use energy consumption in the residential sector: A review of modeling techniques", Renewable and Sustainable Energy Reviews, vol. 13, Issue 8, Oct. 2009, pp. 1819-1835.

Nan, et al., "SmartBoxes for Interactive Urban Reconstruction", ACM Transactions on Graphics—Proceedings of ACM SIGGRAPH 2010, vol. 29, Issue 4, Jul. 2010, Los Angeles, California.

Judkoff, et al, Building Energy Simulation Test for Existing Homes (BESTEST-EX), Technical Report, NREL/TP-550-47427, Aug. 2010.

\* cited by examiner

BUILDING ENERGY ANALYSIS TOOL

CROSS REFERENCE

This application claims priority from U.S. Provisional Patent Application No. 61/495,646, filed on Jun. 10, 2011, entitled "Automated Geometry and Material Capture Tool for Building Energy Modeling," the contents of which are incorporated herein by reference.

The United States Government has rights in this invention under Contract No. DE-AC36-08GO28308 between the United States Department of Energy and the Alliance for Sustainable Energy, LLC, the Manager and Operator of the National Renewable Energy Laboratory.

BACKGROUND

Energy consumption is a growing concern in the design and maintenance of buildings. Intelligent building design and energy efficient building components can make a great difference in the cost of operating a building over the building's lifetime.

Building energy usage and energy usage efficiency are areas of increasing concern due to rising energy costs and increasing levels of building regulations. Consequently, there is an increasing need for energy audits on buildings, including both for existing buildings for the purpose of retrofitting and improving energy efficiency, and for buildings in either the design or construction phase.

Building energy audits, modeling, performance analysis, and identification of beneficial retrofits have traditionally been fragmented activities, when in fact there is natural synergy for information flow. Processes that integrate these activities and exploit common data will improve efficiency and the quality of energy outcomes.

Consumers in the building sector may hire human auditors to perform an audit at one of three levels of completeness as defined by the American Society of Heating, Refrigeration, and Air-Conditioning Engineers (ASHRAE). An audit is typically conducted with the expectation of receiving a summary report, retrofit recommendations, and/or energy models to be used for certification.

Unfortunately, in the prior art there is substantial variability in human-generated building energy audits. A prior art human-based energy audit may suffer from a substantial variability in interpretation of the three audit levels. A prior art human-based energy audit may suffer from a substantial variability in the cost of the process. But the most significant drawback in the prior art is that a prior art energy audit may suffer from a substantial variability in the quality of the result.

Tools and processes that gather and analyze pertinent data consistently and efficiently are required to address this widespread problem. As energy efficiency expectations continue to rise, there is a need for a fast, inexpensive, and most of all uniform building energy assessment process that can make investment-grade recommendations for building retrofits.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods which are meant to be exemplary and illustrative, not limiting in scope. In various embodiments, one or more of the above-described problems have been reduced or eliminated, while other embodiments are directed to other improvements.

A building energy analysis system is provided according to an embodiment comprising a building component library configured to store a plurality of building components, a modeling tool configured to access the building component library and create a building model of a building under analysis using building spatial data and using selected building components of the plurality of building components stored in the building component library, a building analysis engine configured to operate the building model and generate a baseline energy model of the building under analysis and further configured to apply one or more energy conservation measures to the baseline energy model in order to generate one or more corresponding optimized energy models, and a recommendation tool configured to assess the one or more optimized energy models against the baseline energy model and generate recommendations for substitute building components or modifications.

A building energy analysis method is provided comprising generating a building model of a building under analysis, operating the building model to generate a baseline energy model for the building under analysis, applying one or more energy conservation measures to the building model and generating one or more corresponding optimized energy models, and assessing the one or more optimized energy models against the baseline energy model and generating recommendations for substitute building components or building modifications.

A building energy analysis method is provided comprising receiving building components for a building under analysis, with receiving the building components comprising receiving user selections of previously-stored building components stored in a building component library or receiving building component inputs and converting the building component inputs into corresponding building components if the building component inputs do not correspond to building components in the building component library, capturing geometric characteristics of physical building components of the building under analysis, converting the geometric characteristics into corresponding building spatial data, locating the building components relative to the building spatial data to generate a building model, operating the building model to generate a baseline energy model for the building under analysis, applying one or more energy conservation measures to the building model and generating one or more corresponding optimized energy models, and assessing the one or more optimized energy models against the baseline energy model and generating recommendations for substitute building components or building modifications.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in reference figures of the drawings. It is intended that the embodiments and figures disclosed herein are to be considered illustrative rather than limiting.

DETAILED DESCRIPTION

Figure 1:
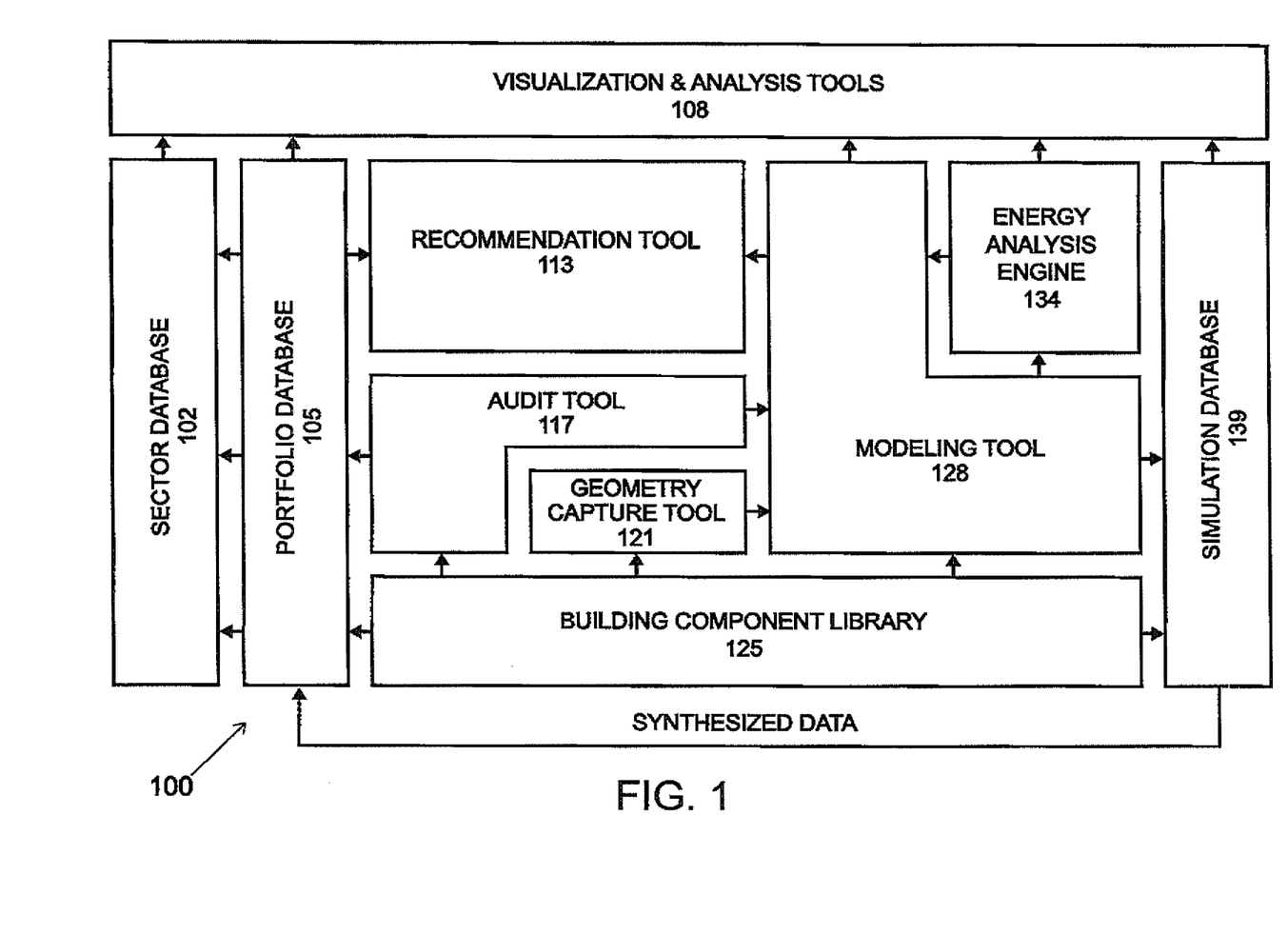
FIG. 1 shows an exemplary building energy analysis system.
Figure 2:
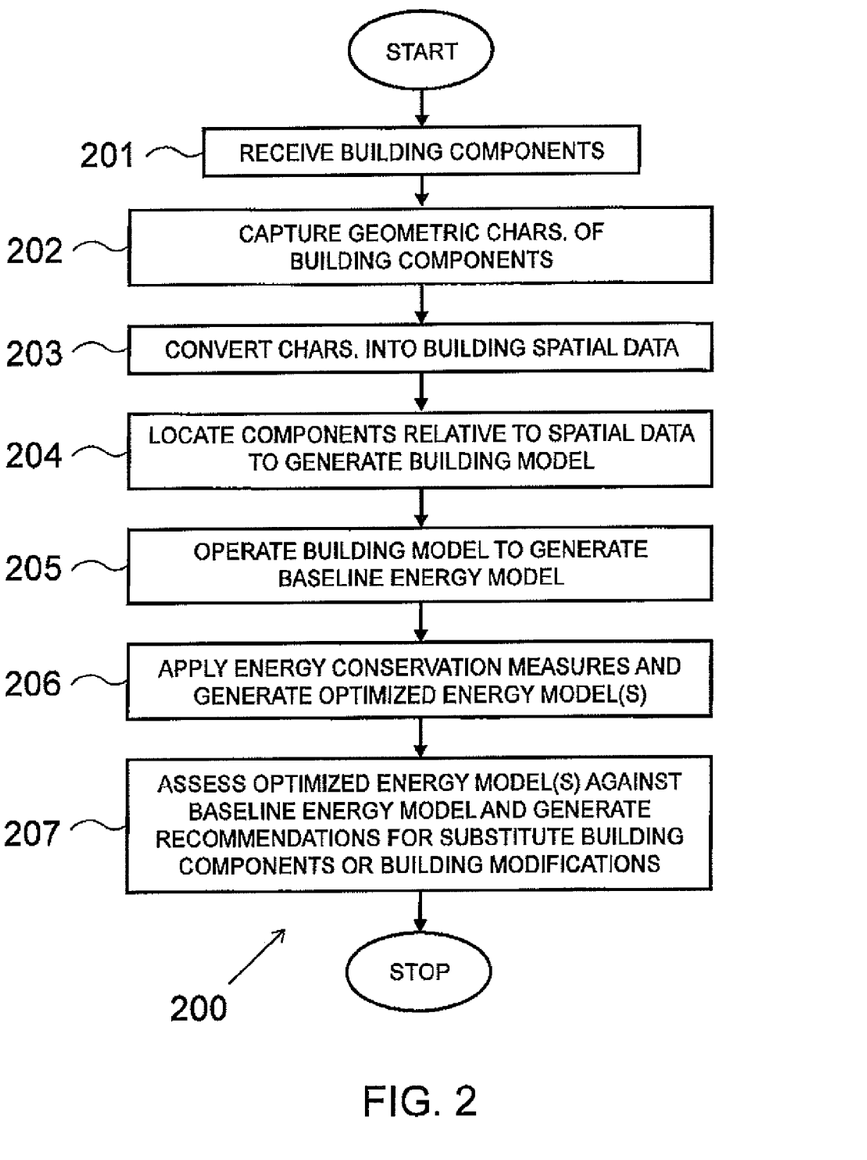
FIG. 2 shows a flowchart of a building energy analysis method.
Figure 3:
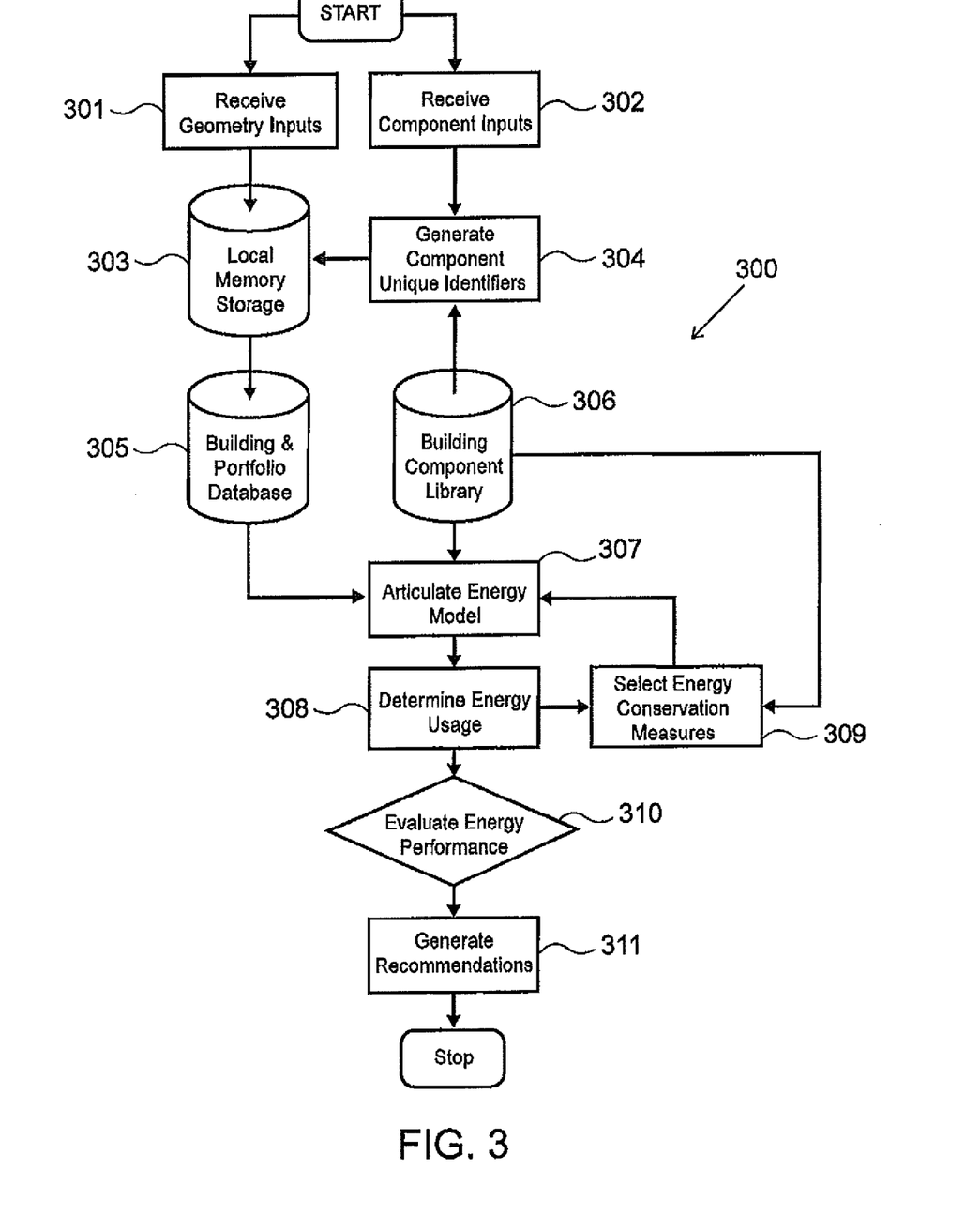
FIG. 3 shows a building energy analysis workflow chart.

FIGS. 1-3 and the following description depict specific examples to teach those skilled in the art how to make and use the best mode of embodiments of a building energy analysis system. For the purpose of teaching inventive principles, some conventional aspects have been simplified or omitted. Those skilled in the art will appreciate variations from these examples that fall within the scope of the present description. Those skilled in the art will appreciate that the features described below can be combined in various ways to form multiple variations of the disclosed exemplary implementations of a building energy analysis system. As a result, the embodiments described below are not limited to the specific examples described, but only by the claims and their equivalents.

FIG. 1 shows an exemplary building energy analysis system 100. The building energy analysis system 100 in some embodiments comprises one or more sector databases 102, a building and portfolio database 105, a plurality of visualization and analysis tools 108, a recommendation tool 113, an audit tool 117, a geometry capture tool 121, a building component library 125, a modeling tool 128, an energy analysis engine 134, and a simulation database 139.

A user can use the building energy analysis system 100 to enter and/or select building components. The user can use the building energy analysis system 100 to receive user selections of previously-stored building components stored in the building component library 125. The user can use existing building component entries to create the building under analysis. The user can use the building energy analysis system 100 to receive user-generated building component inputs and convert the building component inputs into corresponding building components if the building component inputs do not correspond to building components in the building component library 125. The user can use existing building component entries to create similar but appropriate new building component entries. As a result, the user can create a building to be analyzed by specifying the components of the building under analysis and forming a partial or complete assemblage of building components.

The user can use the building energy analysis system 100 to capture geometric characteristics of physical building components, convert the geometric characteristics into corresponding building spatial data, and locate the building components relative to the building spatial data to generate the building model. The building energy analysis system 100 can therefore be used to form a building model of a building under analysis using building spatial data and the assemblage of building components. Alternatively, the user can use a previously-assembled, existing building model to perform an energy audit, or can use any previously-generated and stored information, including partial or complete building information.

The building energy analysis system 100 can be accessed and used to perform an energy usage analysis on a building. In some embodiments, a person may access the building energy analysis system 100 to generate a building model of a building under analysis, operate the building model to generate a baseline energy model for the building under analysis, apply one or more energy conservation measures to the building model and generate one or more corresponding optimized energy models, and assess the one or more optimized energy models against the baseline energy model and generate recommendations for substitute building components or building modifications.

An energy conservation measure may comprise descriptive metadata along with self-contained, automated model scripts that operate on a building energy model by swapping components (e.g., low efficiency lights or HVAC for high efficiency equivalents), modifying the building envelope (e.g., applying window shadings on south facing facades), modifying operational characteristics of the building (e.g., optimizing set points or operating schedules), or otherwise transforming the building (e.g., adding skylights or tubular lighting systems, modifying window to wall ratio, et cetera). An energy conservation measure may also contain descriptive information regarding procurement and installation of a measure along with case studies of the energy conservation measure as it has been applied in practice.

The purpose of the building energy analysis system 100 is to provide a resource that may be widely accessed and used. The building energy analysis system 100 is a resource that accumulates building component information, including building component energy usage information and building energy usage information. The building energy analysis system 100 is a resource that may acquire enough building information over time wherein a user may be able to find an identical or substantially similar building in the building energy analysis system 100 and therefore have quick and easy access to building energy usage information.

Building energy audits, modeling, performance analysis, and identification of beneficial retrofits have traditionally been fragmented activities. The building energy analysis system 100 achieves an improvement in the art by integrating these activities. The building energy analysis system 100 achieves an improvement in the art by accumulating data. The building energy analysis system 100 achieves an improvement in the art by sharing common data. The building energy analysis system 100 achieves an improvement in the art by aggregating knowledge through the shared efforts of many users. As a result, the building energy analysis system 100 will improve efficiency and improve the quality of energy outcomes.

The building energy analysis system 100 can enable and facilitate team auditing. The building energy analysis system 100 can receive and aggregate inputs and data from multiple auditors. The building energy analysis system 100 can be used to coordinate data gathering tasks and supply consistent data collection forms to multiple auditors, wherein gathered data will feature improved consistency. The building energy analysis system 100 may be used to identify and track audit work assignments. The building energy analysis system 100 may guide user entry using a comprehensive audit workflow that embodies industry best practices. The building energy analysis system 100 can be used to coordinate auditors on a project basis.

The building energy analysis system 100 in some embodiments comprises a framework for interoperating tools that facilitate the process of building energy modeling, as well as performing general and specific retrofit opportunity identification. The building energy analysis system 100 advantageously may exploit common data stores and application program interfaces to create an effective, robust, and transparent user experience. The building energy analysis system 100 may employ applications that operate on multiple computing devices and servers.

The building energy analysis system 100 streamlines the process of gathering the needed building information, developing energy models, and identifying specific retrofit recommendations. The building energy analysis system 100 therefore lowers the barrier to entry of building energy auditing in terms of both actual and opportunity costs.

The building energy analysis system 100 increases the adoption of analysis-based retrofit identification, and therefore increases energy efficiency. The building energy analysis system 100 provides a convenient and cost effective method of modeling and identifying retrofit options for existing buildings.

The one or more sector databases 102 comprise one or more storage facilities for storing building information. The building information may comprise building information entered by one or more persons. The one or more sector databases 102 may comprise building information including a building model. The one or more sector databases 102 may include aggregated building components and/or aggregated building component information. The one or more sector databases 102 may include only anonymized metadata regarding individual buildings in some embodiments.

The one or more sector databases 102 may store asset rating and performance information from buildings across a building sector. For example, the one or more sector databases 102 may include National Renewable Energy Laboratory (NREL)'s "High Performance Buildings" database and may include a new actuarial database being developed for the Department of Energy (DOE). The one or more sector databases 102 may be used to aggregate and store the information for a large number of buildings. The one or more sector databases 102 may be used to store the information in a manner that enables statistically-driven analysis of performance and retrofit measure effectiveness.

The building and portfolio database 105 comprises a storage facility for storing raw audit results. The raw audit results may comprise a single building raw audit result or may comprise a raw audit result for a collection of buildings.

The building and portfolio database 105 may comprise a component of the building energy analysis system 100 or may comprise an external repository that is in communication with the building energy analysis system 100. Alternatively, the building and portfolio database 105 may comprise a portion of the building component library 125. In some embodiments, the building and portfolio database 105 may comprise a web-accessible database that may include both a web interface and an Application Program Interface (API). In some embodiments, a portion of the building and portfolio database 105 may be held in a memory of the audit tool 117 during offline operation of the audit tool 117.

The building component library 125 comprises a storage facility for storing building components. Examples of building components are wall and window constructions, HVAC components, descriptions for miscellaneous electric loads, weather data, information related to specific retrofit measures, plug loads, codes and standards, utility rate data, and/or complete subsystems. In this context, a building component consists of high level metadata describing attributes of the component as might be obtained from a specification sheet or from physical measurements. Components may include but are not limited to window or wall constructions, energy consuming devices like computers or televisions, HVAC equipment, motors, lamps, ballasts, and fixtures that comprise luminaires, archetypal descriptions of occupants, schedules, geo-located weather data, geo-located water mains temperatures, geo-located utility rate data, photovoltaic panels, inverters, et cetera. The component may also contain a description of the component's performance described in syntax appropriate for building energy modeling. Further, a component may include related data such as means or site-specific cost, images, best-practices for selection and installation, etc.

The building component library 125 may include metadata comprising a component taxonomy (tagging system) that enables searches and may include a flexible and extensible set of attributes that further define the building components. The set of attributes for a component may include length, width, weight, cost, coefficient of performance, R-Value, U-Factor, data provenance, supporting video, and images. It should be understood that this is not an exhaustive listing of stored information. Other building component information is contemplated and is within the scope of the description and claims.

In addition, the building component library 125 may store whole building models. Model input can be stored in multiple formats including OpenStudio®, EnergyPlus, and DOE-2 data formats, for example. Other building models/model data formats are contemplated and are within the scope of the description and claims.

The building component library 125 may comprise a component of the building energy analysis system 100. Alternatively, the building component library 125 may comprise an external repository that is in communication with the building energy analysis system 100. For example, the building component library 125 may comprise the library available at the NREL website.

The building component library 125 may comprise a web-based database. Alternatively, the building component library 125 may be coupled to a web-based device or component. In some embodiments, the building component library 125 may comprise a web-accessible database and may include both a web interface and an API. In another alternative, the building component library 125 may be in communication with other components of the building energy analysis system 100 in any suitable manner. The building component library 125 may be integrated with the audit tool 117 via an API.

In some embodiments, the building component library 125 may store information for a wide range of buildings and a wide range of components. The building component library 125 may store information accumulated from a wide variety of persons and/or institutions. The building component library 125 may store information accumulated over a large period of time. In this regard, the building component library 125 may serve as a repository and knowledge base for building component energy usage information and building energy usage information.

The potential scope of a fully populated building component library 125 is substantial, and the cost to populate it is significant. To this end, the building component library 125 has been designed with social development in mind. Components may be publicly submitted and rated with comments fed back to the component originator. Publicly submitted components may be distinguished from those submitted by standards organizations or other trusted sources. The building component library 125 is capable of multi-faceted searching, enabling users to quickly identify relevant components that meet specific requirements. The faceted searching will allow end users to identify appropriately vetted components based upon their needs.

The building component library 125 may be populated as a result of crowdsourcing. The building component library 125 may receive entries from a large variety of persons, wherein the time and effort required in building a comprehensive repository of component energy usage information and building energy usage information is done by users of the building energy analysis system 100, over time. The audit tool 117 may provide convenient input forms to simplify the addition of new components to the building component library 125.

Penetration of building energy modeling has been limited across the sector due to the complexity of analysis tools, but also the difficulty associated with gathering appropriate and trusted input data. The building component library 125 is intended to address this latter issue by simplifying the task of formulating model inputs and enabling the automated articulation of energy models by reference to unique component identifiers. Providing mechanisms to cite and/or repeat previous energy analyses will also provide substantial benefit through easier replication of design and transparency for those who are required to inspect the underlying assumptions of a given analysis.

The building component library 125 may also serve as the repository or a gateway to other databases that aggregate information regarding components identified in real buildings. In this way, a mobile device may be used as a building inventory tool. A mobile device may gather information for asset management systems related to specific projects, portfolios, or, when anonymized, as data for sector-wide inventories of components, retrofit measures, and energy performance. A mobile device may relay gathered information to the building component library 125.

The building component library 125 may include an API. The API enables external search and retrieval of component model data. In some embodiments, the building component library 125 may be integrated with the modeling tool 128 and/or the audit tool 117 in order to present users with transparent access to data. Each piece of data in the building component library 125 may be revised. Each piece of data may be affixed with a unique identifier that enables citation, a critical capability if energy modeling is to be both credible and repeatable.

The API may be included so that other components of the building energy analysis system 100, such as the modeling tool 128 or the audit tool 117, for example, may have programmatic access to component models stored in the building component library 125. It should be understood that the API could also be used to access the component models over the Internet (or other communication system).

The simulation database 139 comprises a storage facility for storing temporary or long-term simulation data. The simulation database 139 may comprise a component of the building energy analysis system 100 or may comprise an external repository that is in communication with the building energy analysis system 100. Aggregation of simulation results can enable crowd-sourced identification of climate-appropriate energy conservation measures to reduce the computational expense of parametric analysis needed to identify measures for a specific building.

Visualization and analysis tools 108 comprise a plurality of tools for presenting data to a user or users. Visualization and analysis tools 108 may be built on top of the building and portfolio database 105, directly on the modeling tool 128 or analysis engine 134, or on top of one or more sector and simulation databases 102. Visualization and analysis tools 108 may therefore comprise any manner of output device, including a display, projector, printer, transmitter, or other communication relay or device, or other appropriate communication or output device. Such tools may operate directly on a mobile or desktop computing device or through a web service over the Internet utilizing results contained in any of the building energy analysis system 100 databases. In some embodiments, the visualization and analysis tools 108 may comprise a combination of mobile application and web functionality. Direct user interfaces to client applications may be made available.

Visualization and analysis tools 108 may take a number of forms. Visualization and analysis tools 108, when comprising the simplest visualization tools, may provide quick assessment of the completeness of a building and portfolio database 105 and may provide simple report generation. Visualization and analysis tools 108 in other embodiments may be configured to compare performance between buildings, including buildings within or across portfolios, to make data-based retrofit recommendations as opposed to knowledge-based recommendations.

The recommendation tool 113 comprises a tool for evaluating a recommended energy conservation measure or measures for a selected building component in order to determine whether a different building component or some manner of building modification would be beneficial. The recommendation tool 113 may evaluate the selected energy conservation measure to determine whether, and how, the selected energy conservation measure may be optimally retrofitted. The recommendation tool 113 may evaluate the selected energy conservation measure on the basis of known or projected energy usage. The evaluation may compare the energy usage for the selected energy conservation measure to the energy usage of other, equivalent energy conservation measures. In addition, the evaluation may take into account other factors, such as availability, cost, and so forth.

One need in performing an energy audit is in identifying specific retrofit measures that will save energy and operating cost for an existing building. Advantageously, the task may be broken down to the measure level, wherein comparisons and resulting recommendations can be coded in conditional statements implemented in computer software. A collection of comparisons and recommendations can comprise an expert system. The recommendation tool 113 may be implemented in whole or part as an expert system.

The recommendation tool 113 may take into account various criteria when making a recommendation for a building energy conservation measure. The recommendation tool 113 may take into account the energy impact and/or the cost of applying specific energy conservation measures. By assessing the performance of an energy conservation measure as part of a whole building energy analysis, the often-neglected interaction effects of a measure can be fully assessed. The recommendation tool 113 may also indicate the availability of one or more recommended energy conservation measures, applicable building codes or regulations, applicable energy efficiency guidelines or codes, required or desired percentage improvement in building energy usage performance, the prevailing or likely environmental conditions, the quality/lifespan ratings of the selected energy conservation measures, and/or the potential impact of applying energy conservation measures on building labeling or ratings. It should be understood that this listing is not exhaustive. Other recommendation criteria are contemplated and are within the scope of the description and claims.

The recommendation tool 113 may interact with the audit tool 117 to provide tailored building energy conservation measure recommendations to the user. Expert knowledge may be encapsulated within the audit tool 117 or may be included within a plug-in, separate application, or via an integrated web service. Expert knowledge may be derived from building construction best practices and/or building materials best practices, NREL advanced energy design or retrofit guides, environmental regulations or guidelines, or the like. The recommendation tool 113 in some embodiments may be integrated with the audit tool 117 to provide immediate feedback during the audit data collection process or as part of a summary report at the end of the process.

Aggregation of the audit data of many buildings into one or both of the building and portfolio database 105 or the sector database 102 operates to create significant populations of data that can subsequently be mined using statistical methods to identify energy performance trends associated with retrofit measures across building types and climate zones. This can be performed using the visualization and analysis tools 108, where the visualization and analysis tools 108 interact with the sector database 102 and/or the building and portfolio database 105. These tools may be implemented as a separate application or web based service, although this functionality could be included directly within the mobile audit tool 117.

In another embodiment, recommendations may be made based on an automatically generated whole-building energy analysis using a range of energy conservation measures articulated via the modeling tool 128 and simulated using the energy analysis engine 134. For example, the energy analysis can provide recommendations ordered by priority of most energy and/or cost effective energy conservation measures, or according to other criteria. A prioritizing embodiment provides the benefit producing higher fidelity recommendations that consider the interactions of proposed energy conservation measures. Further, the recommendation tool 113 in the preferred embodiment may receive recommendation data from the modeling tool 128 and energy analysis engine 134.

The audit tool 117 comprises a tool for gathering building component information and associating it with spaces within a building. The audit tool 117 may receive and gather building component inputs from a user. The audit tool 117 may receive and gather building component inputs in alphanumeric form or via constrained data entry forms, for example. The audit tool 117 may receive and gather image data or graphical data obtained from a camera or other image-capturing device. In addition, the audit tool 117 may catalog characteristics of the received building component inputs, such as a building's construction, geometry, and included energy consuming devices, such as appliances, computer devices, and lighting, for example.

In another embodiment, the building's envelope and interior geometries may be obtained through scanned or photographed floor plans or fire escape plans. The ability to capture building envelope and space geometry information from photometric sources is one capability or function of the geometry capture tool 121.

In another embodiment, the building's envelope and interior geometries may be obtained through direct import of building information model data exchange formats, such as industry foundation classes (IFC), green building extended markup language (gbXML), or data file exchange (dfx) formats, for example. In this embodiment, the audit tool 117 data persistence schema may be extended to directly encapsulate this additional information or the schema may reference external data files that are consumed and translated by the modeling tool 128.

The audit tool 117 may exist on a stationary computer or device or may exist on a portable computer or device. In some embodiments, the audit tool 117 may comprise a mobile application and/or tool. The audit tool 117 may include some functionality in common with the geometry capture tool 121, such as where the audit tool 117 is located on a mobile device.

Alternatively, a more capable audit tool 117 in some tablet computer-based embodiments may use photometric input of building floor plans to identify space or thermal zone boundaries. Once identified, a user may visually select spaces or thermal zones using a touch screen interface or other interface device. Once spaces or thermal zones are selected, then one or more forms may be presented to the user in order to gather information regarding space or thermal zone constructions, lighting, miscellaneous electrical loads, HVAC equipment, occupancy schedules, etc. Some or all of this information could be captured photometrically by a camera-enabled tablet.

Specific information regarding space or thermal zone contents may be contained within the building component library 125 and linked to the tablet's inventory using a unique identifier for that component. For example, if a light fixture was indicated via user form input on the audit tool 117, potential components contained in the building component library 125 could be automatically suggested to the user. Upon selection, that device would be added to the audit tool 117 database persisted in memory or in the building or portfolio database 105 using the unique identifier for the component. In the event that the building component library 125 does not contain the specific equipment being audited, the user can have the option to enter appropriate information as would be identified in a specification sheet, and upload it to the building component library 125. In this manner, the building component library will become more comprehensive over time.

The audit tool 117 may persist the audit data in an audit tool local memory and/or may persist the audit data in the building and portfolio database 105 according to a defined data schema, depending upon network availability. The building and portfolio database 105 may contain data for a single building or may represent the aggregation of many buildings to describe a portfolio.

The building and portfolio database 105 may receive inputs from multiple auditors using separate copies of the audit tool 117. In this way, multiple auditors may coordinate efforts to quickly gather data for one or more buildings using consistent data collection forms that are automatically aggregated and analyzed.

The audit tool 117 may include functionality to clearly identify audit work assignments and progress to completion for one or more auditors. In this way, the completeness of the building and portfolio database 105 contents may be tracked on a per project basis.

The contents of the audit tool 117 local memory and/or information from the building and portfolio database 105 may be exported to the modeling tool 128 using file import or application program interface in accordance with a data schema.

The data schema may include data or references to data describing plan views, photometric results, building information model data, or other geometric representations that may be used by the modeling tool 128 to specify model geometry. The data schema may include references to building components according to unique identifiers in the building component library 125. These referenced components may be operated on by the modeling tool 128 to construct all or part of a functioning building energy performance model.

The audit tool 117 may comprise a mobile audit tool 117 that communicates and interacts with the building energy analysis system 100. The audit tool 117 may comprise a portable device that can be transported to a building site and used to gather information for building analysis. The audit tool 117 may further be capable of relaying building information to the building energy analysis system 100 in real time, in a batch manner, or upon command by the user of the mobile audit tool 117. The audit tool 117 may further communicate with the building energy analysis system 100 to upload data and initiate processes, including initiating the construction of a building model, initiating the operation of an energy usage analysis employing the building model, initiating an energy usage analysis, and/or initiating a recommendation process where the building energy analysis system 100 recommends energy conservation measures.

The mobile audit tool 117 may further be capable of receiving all manner of processing results from the building energy analysis system 100, including identifying and receiving unique building component identifiers based on user input, receiving information regarding existing building components available to the building energy analysis system 100 and available to be selected and used in a building energy analysis, receiving a display of and/or information regarding a building model, either selected by the user or constructed from user inputs and/or user selections, and/or receiving information generated by an energy usage analysis of the building model, including receiving information from the building model when simulated over a range of environmental conditions.

The geometry capture tool 121 comprises a tool for identifying building interior and exterior geometry, building constructions, and contents. The geometry capture tool 121 may exist on a stationary computer or device, or may exist on a portable computer or device. In some embodiments, the geometry capture tool 121 may comprise a mobile application and/or tool. The geometry capture tool 121 may use a combination of camera and user inputs to quickly identify building components or features. In addition, the geometry capture tool 121 may infer the material or materials used in the building component. The geometry capture tool 121 may draw on data from the building component library 125. The geometry capture tool 121 may output building components and building component information to the modeling tool 128, for example.

The modeling tool 128 comprises a tool configured to automatically articulate energy models of a building under analysis. The modeling performed by the modeling tool 128 may include modeling a portion or entirety of a building under analysis using an assemblage of building components. The assemblage of building components may include building components selected or entered by a user. The model articulation performed by the modeling tool 128 may include modeling the energy usage characteristics of the building under analysis using the individual energy characteristics of the assemblage of building components. The model articulation performed by the modeling tool 128 may include modeling the building under analysis over a range of environmental conditions. The model articulation performed by the modeling tool 128 may include modeling the building under analysis during heating and/or cooling processes, including modeling the heating and/or cooling systems (e.g., modeling the heating, ventilating, and air conditioning (HVAC) equipment).

The audit tool 117 and/or the modeling tool 128 may include forms or tools for specifying or editing various building components, systems, or sub-systems. The audit tool 117 and/or the modeling tool 128 may include graphical editing tools for editing the building geometry, operating schedules, and the building HVAC equipment, for example.

In some embodiments, the modeling tool 128 may interact with, initiate processes in, and regulate the operation of the recommendation tool 113, the audit tool 117, the geometry capture tool 121, and the energy analysis engine 134. The modeling tool 128 in some embodiments may comprise a routine or routines for the overall operation and integration of the building energy analysis system 100. The modeling tool 128 may comprise a routine that interacts with and supervises various components of the building energy analysis system 100. In some embodiments, the modeling tool 128 may comprise a client application or web service.

The modeling tool 128 in some embodiments may comprise a main routine that a user interacts with receiving user inputs, initiating various processes, and regulating the energy usage analysis process (e.g., specifying energy conservation measures to be considered in a detailed analysis). Alternatively, the audit tool 117 may comprise a main routine that initiates and coordinates operations among the various routines and data storages.

In some embodiments, the modeling tool 128 may comprise the OpenStudio software development kit and analysis suite, available from the NREL website. The OpenStudio tool may be integrated with the building component library 125 in some embodiments. It should be understood that other modeling tools may be used and are within the scope of the description and claims.

In some embodiments, the modeling tool 128 incorporates Google® SketchUp®, available from Google. SketchUp provides visualization and visual editing capabilities for building geometry, and facilitates rapid development of building geometry from a variety of data sources. SketchUp is well integrated with the OpenStudio software development kit and analysis suite. The OpenStudio Plug-in for SketchUp has emerged as a primary interface for DOE's EnergyPlus building energy simulation engine in use around the world. It leverages the open source paradigm and the popular Sketch Up application to provide a highly visual and easy to use interface for architects, engineers, and students to effectively describe building geometry for energy efficient design and visualization of performance.

The modeling tool 128 may include an application program interface. The application program interface may be included so that other components of the building energy analysis system 100 may have programmatic access to component models temporarily held or permanently stored in the modeling tool 128. It should be understood that the application program interface could also be used to access the component models over the Internet (or other communication system), for example as a web service.

In some embodiments, the modeling tool 128 may comprise a suite of integrated tools for users and developers, including: i) a substantially enhanced version of the OpenStudio SketchUp Plug-in with new features for retrofit geometry capture, daylighting analysis and workflow improvement, for example, ii) a supporting OpenStudio application that provides access to building energy modeling data resources, building component library integration, visual HVAC system specification, simulation control and reporting, extensibility via open scripting interfaces, and results visualization, iii) a "ResultsViewer" utility, for visualization of detailed time series outputs of energy simulations, and iv) a "RunManager" utility, used to supervise simulations on single and multiprocessor computers as well as super computers. The functionality contained in this integrated suite is made available programmatically via application program interfaces that may be accessed from client applications or as a web service by other components in the building energy analysis system 100.

The modeling tool 128 in some embodiments may comprise an open source platform. The open source platform may allow users to modify, correct, extend, or otherwise customize the modeling tool 128. In some embodiments, the modeling tool 128 may be initially developed by one entity, and then may be refined, expanded, and/or evolved by various parties. It should be understood that the parties allowed to access and change the source code may be limited as desired, so that the source code may not be inadvertently, improperly, or maliciously modified.

The energy analysis engine 134 comprises a tool that interacts with the energy model and generates an energy analysis of the building under analysis. The energy analysis engine 134 may generate overall energy usage values. Such energy usage values may include annual, monthly, daily, or hourly accounting of heating, cooling, lighting, and miscellaneous end uses. The energy analysis engine 134 may generate energy usage values over a range of environmental conditions. The energy analysis engine 134 may operate the model of the building under analysis to generate energy usage predictions. The energy analysis engine 134 may operate the model of the building under analysis over a range of environmental conditions to generate a full range of energy usage predictions, including anticipated environmental conditions.

The energy analysis engine 134 may comprise a specialized tool or may comprise an available tool that is used as part of the building energy analysis system 100. In some embodiments, the energy analysis engine 134 may comprise a client application or web service. For example, the energy analysis engine 134 may comprise the "EnergyPlus" energy analysis engine available from the DOE website. Alternatively, the energy analysis engine 134 may comprise the "DOE-2" energy analysis engine available from James J. Hirsch and Associates at the DOE website. It should be understood that other energy analysis engines are contemplated and are within the scope of the description and claims.

The suite of tools available through the modeling tool 128 may comprise an object-oriented software architecture that builds on the existing EnergyPlus ".idf" file format and abstracts the EnergyPlus .idf file format to a higher level for simple and rapid development of sophisticated applications. Alternately, an object-oriented architecture may build on the existing DOE-2 ".inp" file format. The architecture may be leveraged along with the building component library 125 to create extensible tools for whole-building analysis and optimization.

The energy analysis engine 134 may comprise complementary simulation engines that are designed for the purpose of lighting, daylighting, or airflow network analysis. For example, the Radiance lighting and daylighting simulation engine has been integrated with EnergyPlus using the OpenStudio software development kit (Radiance is available from the Regents of the University of California at the Lawrence Berkeley National Laboratory website). This combination of analysis engines enables a comprehensive assessment of lighting and daylighting energy conservation measures. Alternatively, the "CONTAM" airflow network analysis engine may be likewise integrated to enable higher fidelity assessment of energy conservation measures such as operable windows and natural ventilation systems. The CONTAM application is a multi-zone indoor air quality and ventilation analysis computer program developed by the National Institute of Standards and Technology (NIST), and may be obtained at the NIST's website.

Data interoperability at the building component library layer may be defined by application program interface and extensible markup language (XML) schema. Interactions between the modeling tool 128, the energy analysis engine 134, and external components may be similarly well-defined by applicable application program interfaces. Local memory in the audit tool 117 comprises mobile device storage and may interact with the building component library 125 and the modeling tool 128.

Application program interfaces at the building component library 125 and modeling tool 128 layers can be leveraged and extended to facilitate interoperability with other components in the building energy analysis system 100. These interfaces may also become specifications for additional desktop, mobile, or web applications that provide extended functionality of components in the building energy analysis system 100.

FIG. 2 shows a flowchart 200 of a building energy analysis method. In step 201, building component inputs are received in a building energy analysis system, as previously discussed. The building component inputs may include one or more building component inputs. The building component inputs may be received from one or more persons or users. The building component inputs may be received in any suitable format or arrangement.

User entry of the building component inputs may be guided in order to achieve efficiency and to gather essentially uniform or standardized information. In addition, user entry of the building component inputs in some embodiments may be guided by a comprehensive audit workflow that embodies industry best practice.

The building component inputs may be associated with unique building component library identifiers. The unique identifiers may reference metadata and modeling performance data that is related to building components. The metadata and modeling performance data may include, but are not limited to, standardized building component information, means cost data, relevant energy model software, supporting installation and operation material. The building components may include manufacturer information, including unique or standardized model numbers, product numbers, and descriptive information, for example.

The associated building components may include component characteristics, such as energy usage information, structural information, dimensional information, material composition information, fire safety information, durability information, weather resistance and/or weather rating information, and cost information. Other component information is contemplated and is within the scope of the description and claims.

Building components may also include relevant data such as geo-located weather data, geo-located mains temperatures, operating schedules, and other data that is commonly identified as necessary to conduct an energy audit or fully articulate an energy model.

In step 202, geometric characteristics of the physical building components are captured, as previously discussed. The geometric characteristics may include geometric representations of the building exterior or interior. Such inputs may be collected through a camera integrated within a mobile device, graphical user interfaces that interact with plan drawings or scanned documents, or building information modeling formats, as previously discussed.

In step 203, the captured geometric characteristics are converted into building spatial data, as previously discussed.

In step 204, the building components are located relative to the building spatial data to generate a building model for the building under analysis, as previously discussed. The building component inputs are associated with building spatial data in order to locate constructions, equipment, occupancy schedules, et cetera, with the spaces or thermal zones being defined for the building.

In step 205, the building model is operated to generate a baseline energy model for the building under analysis, as previously discussed. The energy model may be used to simulate operating conditions of a heating or cooling process and simulate the energy usage of the building as a whole. The energy model may be used to simulate operating conditions of a building heating/cooling system over a range of environmental conditions.

The energy model may model the energy usage of the building in part or as a whole. The energy model may model the energy usage of the building over a range of environmental conditions. The energy model may take into account the interactions between various building components, such as how air exchange and/or infiltration may affect a heating or cooling system. The energy model may take into account how the choices of various building components, and the thermal characteristics of the selected building components, will load or overtax a heating or cooling system.

In addition, the energy model for the building under analysis may be used to determine problematic building regions or building components that exhibit a high or even excessive energy usage. The problematic building regions or building components may comprise a building component or components that have an energy usage that is greater than a predetermined threshold. The problematic building regions or building components may comprise a building component or components that have an energy usage that is greater than an accepted standard, building code, energy code, or other regulation or guideline. The problematic building regions or building components may comprise a building component or components that have an energy usage that is excessive relative to other components of the building. The problematic building regions or building components may comprise a building component or components that have an energy usage that may place an undue burden on the heating/cooling system of the building.

In step 206, one or more energy conservation measures are applied to the building model to generate one or more optimized energy models, as previously discussed. An energy conservation measure may comprise descriptive metadata along with self-contained, automated model scripts that operate on a building energy model by swapping components (e.g., low efficiency lights or HVAC for high efficiency equivalents), modifying the building envelope (e.g., applying window shadings on south facing facades), modifying operational characteristics of the building (e.g., optimizing set points or operating schedules), or otherwise transforming the building (e.g., adding skylights or tubular lighting systems, modifying window to wall ratio, et cetera). The energy conservation measure may also contain descriptive information regarding procurement and installation of a measure along with case studies of the energy conservation measure as it has been applied in practice, as previously discussed.

In step 207, the one or more optimized energy models are assessed against the baseline energy model, as previously discussed, and recommendations are generated from the assessing, comprising recommendations for substitute building components or for building modifications, as previously discussed. The recommendations can comprise recommendations for substitute building components or modifications that could be used for reducing energy usage. The recommendations can comprise recommendations for substitute building components or modifications that could be used for at least the identified problematic building regions or building components. The recommendations can comprise recommendations for substitute building components or modifications that could be used beyond, and in addition to, the identified problematic building regions or building components.

The recommendations may comprise recommendations for application of energy conservation measures, which may include replacement or modification of some or all of the identified problematic building regions or building components. However, it should be understood that the recommendations are not limited to the identified problematic building regions or building components.

Replacement may comprise finding a substitute building component in a design for a building yet to be built. Alternatively, replacement may comprise retrofitting an existing building, replacing current components with more energy-efficient building components.

In another alternative, the recommendation can comprise a recommendation to add or remove a building component. A recommendation of removal of a building component may be done where a better substitute building component cannot be found. A recommendation of removal of a building component may be done where a better substitute building component is not available. A recommendation of removal of a building component may be done where a better and yet cost-effective substitute building component cannot be found.

The recommendations may include information regarding energy usage of the problematic building regions or building components. The recommendations may include a list of one or more substitute building components that may be used as a replacement for a currently-specified building component. The recommendations may include information regarding energy usage of one or more substitute building components. The recommendations may include information regarding energy and cost savings for each substitute component of the one or more substitute building components. The recommendations may include information regarding purchase cost differences between the current building component and the one or more substitute building components.

FIG. 3 shows a building energy analysis workflow chart 300. In block 301, the building energy analysis system receives geometry characteristics inputs for the building components of the building under analysis, as previously discussed.

In block 302, the building energy analysis system receives building component inputs for the building components of the building under analysis, as previously discussed. It should be understood that blocks 301 and 302 are not limited to the order shown.

In block 303, the building energy analysis system stores the unique component identifiers and the received geometry inputs in a local memory storage. The local memory storage can be a component of a fixed computer system or can be a component of a portable computer device, as previously discussed.

In block 304, the building energy analysis system generates unique building component identifiers, using the received building component inputs 302 and the building component library 306.

In block 305, the building energy analysis system stores the received building component inputs and the unique building component identifiers in the building and portfolio database 305. This may be done in real time or may be done when the local memory storage 303 goes online, wherein the local memory storage can upload any held data at that time.

In block 306, the building energy analysis system accesses data from the building component library 306 for the purpose of generating a baseline energy model, as previously discussed.

In block 307, the building energy analysis system articulates a baseline energy model using information from the building and portfolio database 305 and from the building component library 306.

In block 308, the building energy analysis system operates the baseline energy model and determines an energy usage of the baseline energy model.

In block 309, the building energy analysis system selects one or more energy conservation measures to be used to improve the energy usage of the building under analysis. The one or more energy conservation measures are used to perturb the baseline energy model 307, as previously discussed.

In block 310, the building energy analysis system evaluates the energy performance of the one or more energy conservation measures, assessing the one or more optimized energy models against the baseline energy model, as previously discussed.

In block 311, the building energy analysis system generates recommendations for substitute building components or building modifications, as previously discussed.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

We claim:

1. A building energy analysis system, comprising:
at least one processor;
at least one computer readable storage medium, the at least one computer readable storage medium having stored thereon a building component library comprising a plurality of building components;
an audit tool operable by the at least one processor to:
receive first user input selecting, for a building under analysis and from the plurality of building components, one or more building components to be included in a building energy model of the building under analysis, and
receive second user input indicating a respective location of each of the one or more building components relative to building spatial data that corresponds to the building under analysis;
a modeling tool operable by the at least one processor to generate, based on the first user input, the second user input, and the building spatial data, the building energy model of the building under analysis;
a building analysis engine operable by the at least one processor to:
generate, using the building energy model of the building under analysis, baseline energy usage information for the building under analysis,
automatically apply one or more energy conservation measures to the building energy model to generate one or more optimized building energy models, and
generate, based on the one or more optimized building energy models, one or more corresponding sets of optimized energy usage information; and
a recommendation tool operable by the at least one processor to:
compare the one or more sets of optimized energy usage information to the baseline energy usage information, and
output one or more recommendations for substitute building components or modifications, the one or more recommendations being based on the comparing.

2. The building energy analysis system of claim 1, wherein the audit tool is further operable by the at least one processor to:
receive user input defining a new building component, and
responsive to determining that the new building component does not correspond to any of the plurality of building components of the building component library, add the new building component to the building component library.

3. The building energy analysis system of claim 1, further comprising a geometry capture tool operable by the at least one processor to:
capture geometric characteristics of the building under analysis, and
generate, based on the geometric characteristics, the building spatial data.

4. The building energy analysis system of claim 3, wherein the geometry capture tool is further operable by the at least one processor to receive input comprising a photograph of at least a portion of the building under analysis,
wherein the geometry capture tool operable to capture the geometric characteristics of the building under analysis is operable by the at least one processor to capture the geometric characteristics from photometric data included in the photograph of at least a portion of the building under analysis.

5. The building energy analysis system of claim 3, wherein the geometry capture tool operable to generate the building spatial data is operable by the at least one processor to identify boundaries of one or more zones within the building under analysis, and wherein the audit tool operable to receive the second user input is operable by the at least one processor to:
output, for display, visual representations of the one or more zones; and
receive user input indicating a respective zone, from the one or more zones, in which each of the one or more building components is located.

6. The building energy analysis system of claim 5, wherein the one or more zones comprise one or more thermal zones within the building under analysis.

7. The building energy analysis system of claim 1, wherein the recommendation tool operable to output the one or more recommendations is operable by the at least one processor to output a plurality of energy conservation measures ordered based on one or more of energy outcomes or cost of ownership outcomes.

8. The building energy analysis system of claim 1, wherein the recommendation tool operable to output the one or more recommendations is operable by the at least one processor to output a recommendation that enumerates most promising energy conservation measures and at least one of: associated procurement guidance for building components used by the most promising energy conservation measures, installation guidance for implementing the most promising energy conservation measures, or relevant case studies of successful application of the most promising energy conservation measures.

9. The building energy analysis system of claim 1, wherein each building component from the plurality of building components comprises at least one of: a parameter defining the energy usage of the building component, a parameter defining the structure of the building component, a parameter defining one or more dimensions of the building component, a parameter defining a material composition of the building component, a parameter defining a fire safety rating of the building component, a parameter defining a durability of the building component, a parameter defining a weather resistance rating of the building component, a parameter defining a weather rating of the building component, or a parameter defining a cost of the building component.

10. The building energy analysis system of claim 1, wherein the building analysis engine operable to automatically apply the one or more energy conservation measures to the building energy model is operable by the at least one processor to:
- determine, based on building components included in the building energy model for the building under analysis, one or more applicable energy conservation measures; and
- apply the one or more applicable energy conservation measures to the building energy model.

11. A building energy analysis method, comprising:
- receiving, by a computing system, first user input indicating, for a building under analysis, one or more building components to be included in a building energy model of the building under analysis;
- receiving, by the computing system, second user input indicating a respective location of each of the one or more building components relative to building spatial data that corresponds to the building under analysis;
- generating, by the computing system and based on the first user input, the second user input, and the building spatial data, the building energy model of the building under analysis;
- generating, by the computing system, and using the building energy model of the building under analysis, baseline energy usage information for the building under analysis;
- automatically applying, by the computing system, one or more energy conservation measures to the building energy model to generate one or more optimized building energy models;
- generating, by the computing system and based on the one or more optimized building energy models, one or more corresponding sets of optimized energy usage information;
- comparing, by the computing system, the one or more sets of optimized energy usage information to the baseline energy usage information; and
- outputting, by the computing system, one or more recommendations for substitute building components or building modifications, the one or more recommendations being based on the comparing.

12. The building energy analysis method of claim 11, further comprising:
- capturing geometric characteristics of the building under analysis; and
- generating, based on the geometric characteristics, the building spatial data.

13. The building energy analysis method of claim 12, wherein capturing the geometric characteristics of the building under analysis comprises:
- receiving input comprising a photograph of at least a portion of the building under analysis; and
- capturing the geometric characteristics from photometric data included in the photograph of at least a portion of the building under analysis.

14. The building energy analysis method of claim 12, wherein generating the building spatial data comprises identifying boundaries of one or more zones within the building under analysis, and wherein receiving the second user input comprises:
- outputting, for display, visual representations of the one or more zones; and
- receiving user input indicating a respective zone, from the one or more zones, in which each of the one or more building components is located.

15. The building energy analysis method of claim 11, wherein receiving first user input indicating the one or more building components to be included in the building energy model of the building under analysis comprises at least one of:
- receiving user input selecting one or more previously-stored building components stored in a building component library; or
- receiving user input defining a new building component and, responsive to determining that the new building component does not correspond to any building components stored in the building component library, adding the new building component to the building component library.

16. The building energy analysis method of claim 11, wherein outputting the one or more recommendations comprises outputting a plurality of energy conservation measures ordered based on one or more of energy outcomes or cost of ownership outcomes.

17. The building energy analysis method of claim 11, wherein outputting the one or more recommendations comprises outputting a recommendation that enumerates most promising energy conservation measures and at least one of associated procurement guidance for building components used by the most promising energy conservation measures, installation guidance for implementing the most promising energy conservation measures, or relevant case studies of successful application of the most promising energy conservation measures.

18. The building energy analysis method of claim 11, wherein each building component from the one or more building components comprises at least one of: a parameter defining the energy usage of the building component, a parameter defining the structure of the building component, a parameter defining one or more dimensions of the building component, a parameter defining a material composition of the building component, a parameter defining a fire safety rating of the building component, a parameter defining a durability of the building component, a parameter defining a weather resistance rating of the building component, a parameter defining a weather rating of the building component, or a parameter defining a cost of the building component.

19. The building energy analysis method of claim 11, wherein automatically applying the one or more energy conservation measures to the building energy model comprises:
- determining, based on building components included in the building energy model for the building under analysis, one or more applicable energy conservation measures; and
- applying the one or more applicable energy conservation measures to the building energy model.

20. A non-transitory computer-readable storage medium encoded with instructions that, when executed, cause at least one processor to:
- receive first user input indicating, for a building under analysis, one or more building components to be included in a building energy model of the building under analysis;
- receive second user input indicating a respective location of each of the one or more building components relative to building spatial data that corresponds to the building under analysis;
- generate, based on the first user input, the second user input, and the building spatial data, the building energy model of the building under analysis;
- generate, using the building energy model of the building under analysis, baseline energy usage information for the building under analysis;

automatically apply one or more energy conservation measures to the building energy model to generate one or more optimized building energy models;
generate, based on the one or more optimized building energy models, one or more corresponding sets of optimized energy usage information;
compare the one or more sets of optimized energy usage information to the baseline energy usage information; and
output one or more recommendations for substitute building components or building modifications, the one or more recommendations being based on the comparing.

\* \* \* \* \*